June 16, 1964

R. C. NOYES ETAL 3,137,798

THERMIONIC POWER SUPPLY

Filed Nov. 22, 1961

INVENTORS
RICHARD C. NOYES
BERNARD L. HOFFMAN
MELVYN L. HENKIN
BY

ATTORNEY

INVENTORS
RICHARD C. NOYES
BERNARD L. HOFFMAN
MELVYN L. HENKIN
BY
ATTORNEY

INVENTORS
RICHARD C. NOYES
BERNARD L. HOFFMAN
MELVYN L. HENKIN

ATTORNEY

United States Patent Office 3,137,798
Patented June 16, 1964

3,137,798
THERMIONIC POWER SUPPLY
Richard C. Noyes, Van Nuys, Bernard L. Hoffman, Canoga Park, and Melvyn Lane Henkin, Los Angeles, Calif., assignors to North American Aviation, Inc.
Filed Nov. 22, 1961, Ser. No. 154,226
12 Claims. (Cl. 310—4)

The present invention is directed to the conversion of heat to electricity and more particularly to portable thermionic power supplies.

Portable power supplies of the prior art generally utilize battery systems or large cumbersome engine-generator systems which have limited shelf life or are of limited application as portable power supplies. The present invention as its primary purpose provides a lightweight, silent, long-shelf-life power supply with greater reliability and ruggedness which requires reduced logistical support.

Therefore it is an object of the present invention to provide a lightweight thermionic power supply for converting heat directly to electricity.

It is another object of the present invention to provide a rugged and reliable power supply utilizing direct conversion of heat to electricity by thermionic means which is powered by conventional fuels.

It is a further object of the present invention to provide a compact, lightweight, portable thermionic power supply with high cathode temperature operation and increased efficiency.

It is a still further object of the present invention to provide a thermionic power supply having an integral fuel supply and an air and fuel preheating system.

It is a still further object of the present invention to provide a thermionic, direct-conversion power supply having automatic control of the output voltage.

It is another object of the present invention to provide a conventional-fuel-fired, direct-conversion power supply utilizing high flame-to-wall heat transfer rates.

These and other objects and advantages of the present invention will be more apparent from the following detailed description and drawings, made a part hereof, in which.

Figure 1:
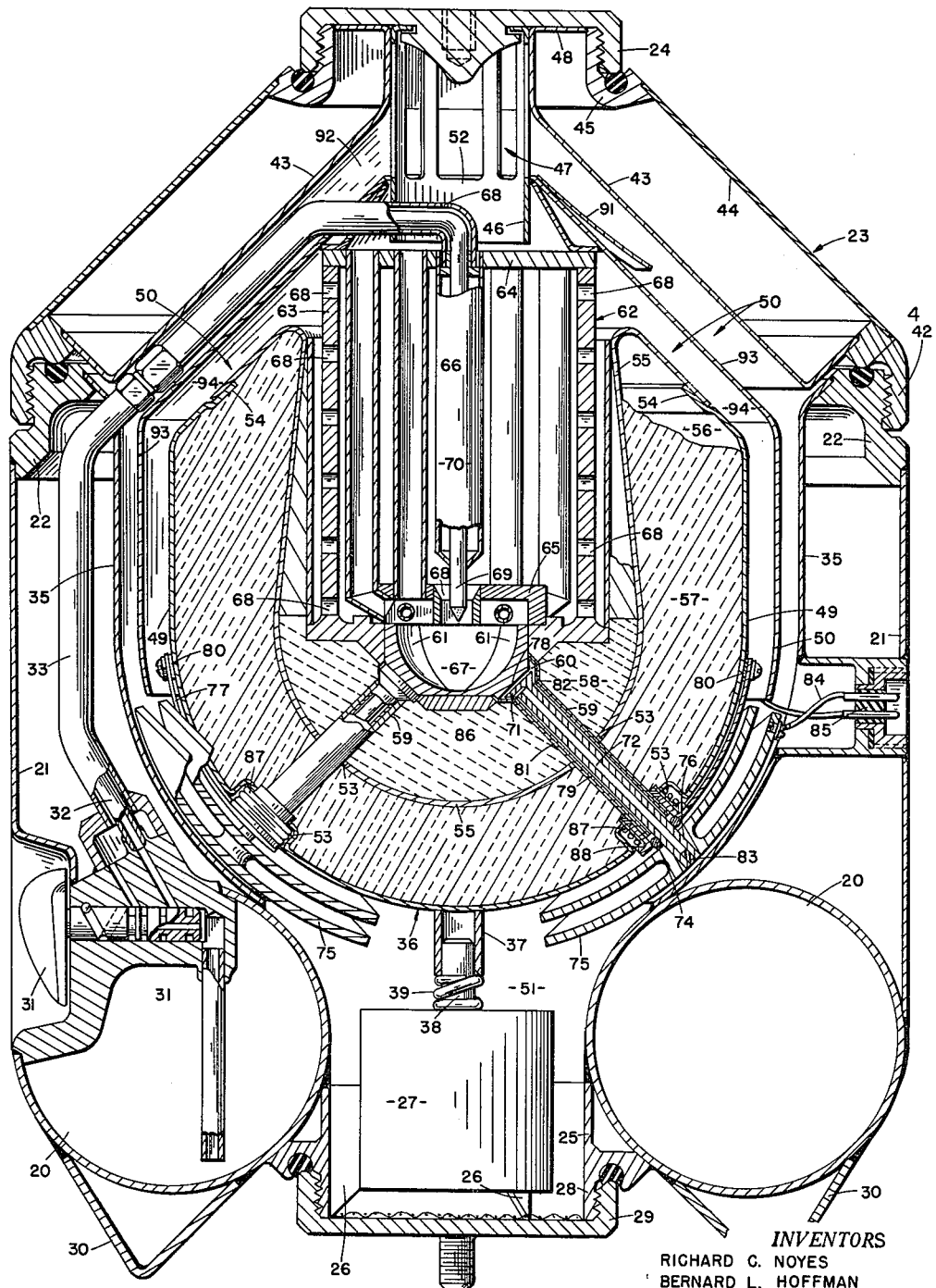
FIG. 1 is a sectional view of the preferred embodiment of the present invention.

Referring now to the drawings in detail, FIG. 1 shows a sectional view of the preferred embodiment of the present invention and comprises a toroidal fuel tank 20, an outer casing 21, a top flange 22, a cover 23, and top cap 24. The fuel tank 20 is integrally connected to the bottom of outer casing 21 and has a centrally located air inlet cylinder 25. The cylinder 25 has an inwardly directed spider support 26 on which a fan or blower housing 27 is rigidly supported, and has a threaded lower end 28 on which a removable screw cap 29 may be placed. A plurality of support legs 30 is also provided on the bottom of tank 20 to provide air inlet openings into the air inlet cylinder when cap 29 is removed during operation. A fuel control valve 31 of standard construction is provided in tank 20 and has a primary fuel outlet pipe 32 and a secondary fuel outlet pipe 33 coaxial with pipe 32. Both pipes 32 and 33 may be connected to the fuel tank 20 through valve 31 or only the inner primary fuel pipe 32 may be so connected depending upon the position of the valve 31. For use of gasoline as the fuel a hand-operated pressurizing pump 34 (see FIG. 2) is also provided to pressurize the fuel tank and thereby force the gasoline through pipes 32 and 33.

An inner casing 35 connects the inside of top flange 22 with the inner surface of tank 20, thereby forming a bowl-shaped cavity into which the removable converter module, indicated generally as 36, is supported. The module 36 is supported at its lower end by a cylindrical extension 37 slidably engaging an upwardly extending shaft 38 around which a support spring 39 is placed. The shaft 38 is integrally connected to the fan housing 27. In this manner the module 36 is held in a spaced position with respect to the inner casing 35. The top of the module is also supported against lateral movement as described in detail hereinafter.

The cover 23 has a lower threaded flange 42 for coupling and sealing to the top flange 22 and an inner liner 43 and outer liner 44 which terminate at their upper ends in a threaded cap flange 45 on which the top cap 24 may be sealed. The top cap 24 has a downwardly extending cylindrical chimney 46 having a plurality of exhaust ports 47 which slidably engage the inner liner 43. The cap 24 in its operative position is displaced upwardly from the position shown in FIG. 1 so that the exhaust ports 47 are located above top surface 48 formed by the inner liner 43.

The converter module 36, which is removably supported within the inner casing 35, has an outside cover 49 which is spaced from the inner casing 35 to form an annular region or chamber 50 which connects the air inlet plenum 51 with the exhaust plenum 52 within the chimney 46. The outer cover 49 is rigidly connected at its upper end 54 to a re-entrant inner cover 55. Both the outer and inner covers 49 and 54 have hemispherical bottom portions and are provided with a plurality of apertures 53 for the thermionic cells as described hereinafter. The inner and outer covers 55 and 49 form a closed chamber 56 which is filled with thermal insulation 57, such as "Min-K." Within the lower spherical container formed by inner cover 55 a hemispherical insulator 58, such as "Super Sil-O-Cel," which has a plurality of thermionic cell openings 59 and has a central chamber 60 into which a plurality of coated, e.g., $MoSi_2$, molybdenum lined parts 61 is supported. Supported on the top surface of the hemispherical insulator 58 is regenerative air preheater unit 62 which in the preferred embodiment is fabricated of alumina sheets and tubes cemented together and consists of an outer perforated cylinder 63, a perforated top tube support 64, a perforated bottom tube support 65, and a plurality of tubes 66. The tubes 66 passes through the top and bottom tube supports, thereby connecting the combustion chamber 67 with the exhaust plenum 52. The perforations 68 allow the incoming air to pass around the tubes 66, which are heated by the escaping combustion gases, to a central air inlet 68 which communicates with the combustion chamber 67. Also supported in the air inlet 68 is fuel nozzle 69 which extends downwardly from and through the top tube support 64. The fuel nozzle 69 is connected to the primary fuel outlet pipe 32, while the coaxial secondary fuel outlet pipe 33 terminates at the top tube support 64 and is provided with a fuel outlet opening 68 above the regenerative heat exchanger. Outlet pipes 32 and 33 provide lateral support for the top of the module 36. The fuel nozzle 69 is enclosed in a sealed shield tube 70 which protects the primary fuel line to nozzle 69 from being heated to a high temperature by the incoming air.

Figure 2:
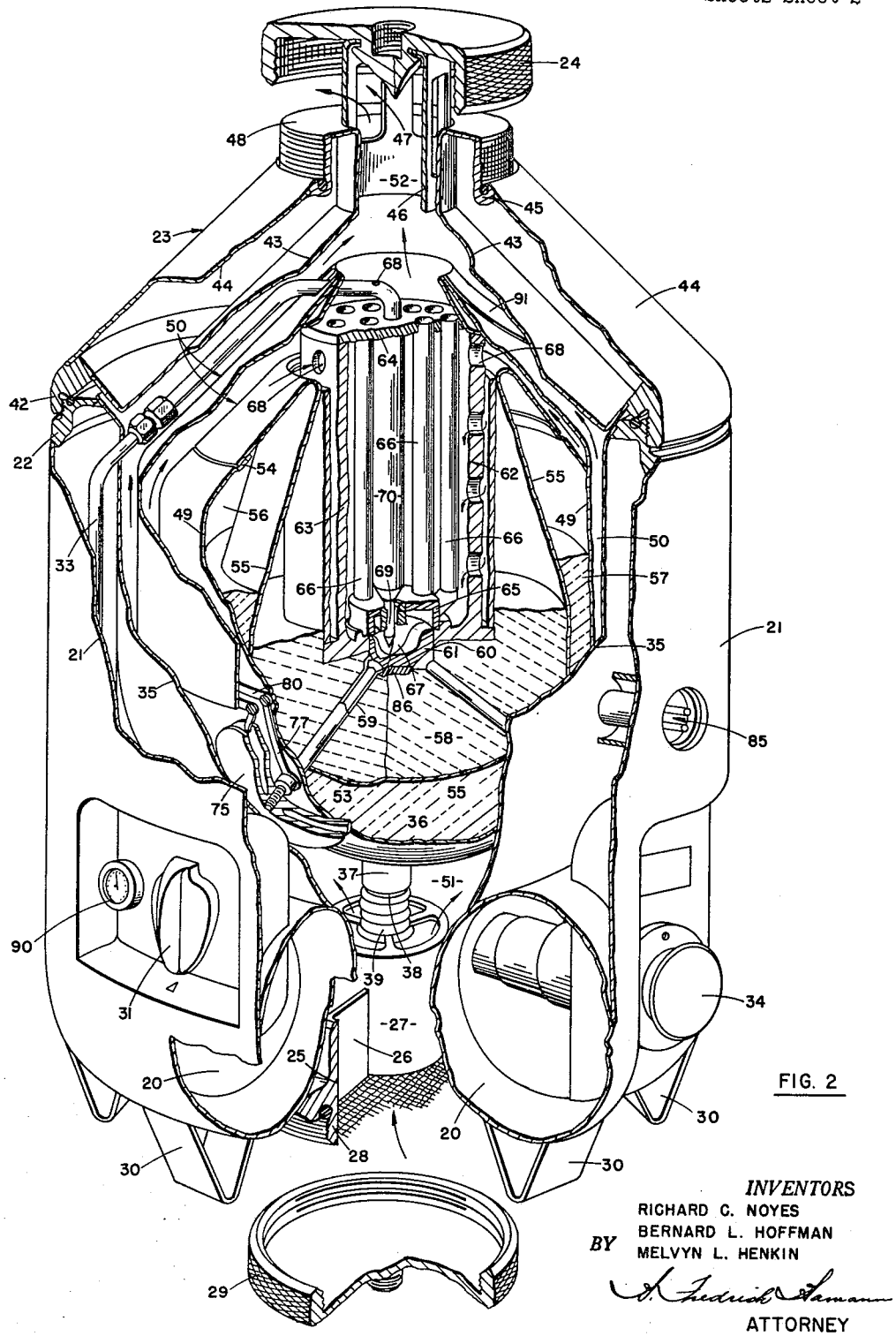
FIG. 2 is a partially sectioned perspective view of the present invention.

Six thermionic converter diodes as shown in FIG. 2 are arranged around the hemispherical combustion chamber 67 and connected in series in the preferred embodiment. Each thermionic converter is composed of a cathode 61, an anode 71, a cesium reservoir 72, radiation shield 73, an insulated seal 74, anode cooling fins 75, a threaded sleeve 76, and cathode electrical lead 77. The cathode 61 has a heat absorbing surface area of 2 cm.² and is fabricated of molybdenum with a molybdenum disilicide coating to protect it from the 5000° F. flame.

It is 0.060 in. thick at the center line of the diode and has a flat emitting surface area 78 of 0.69 cm.$^2$. A 0.185 in. O.D. molybdenum tube 79, having an 0.005 in. wall is used as the cathode lead to minimize the heat conduction loss to the seal insulator 74. A threaded sleeve 76 is brazed to the cold end of the cathode lead tube 79 for the attachment of the cathode electrical lead 77. The other end of the cathode electrical lead 77 is connected by a screw to an insulated terminal post 80 (see FIG. 2) in the anode cooling air passage 50.

The anode 71 is fabricated of copper and nickel plated to resist corrosion. The collector end 80 has the same area as the cathode emitting surface 79 and operates at 1445° F. The interelectrode spacing is 0.008 in. The heat and electricity received from the cathode are conducted down the 0.124 in. O.D. nickel plated copper anode lead 81 to the region of the insulated seal 74, the anode cooling fins 75, and the cesium reservoir 72. The cesium reservoir is maintained at 576° F., its optimum temperature.

The cesium reservoir 72 consists of a 1/16 in. diameter hole drilled along the axis of the anode lead 81, which opens through a radial hole 82 just below the collector portion of the anode. This axial hole is sealed as at 83 after evacuation and loading with cesium. During operation the sealed end of this hole, which is adjacent the anode cooling fins 75, is the coldest portion of the cesium-containing system, and therefore establishes the partial pressure of cesium in the interelectrode space and serves as the cesium reservoir. For a detailed discussion of the operation of a thermionic converter diode, see Direct Conversion of Heat to Electricity, Kaye and Welsh, Part B (John Wiley & Sons 1960). Control of the anode cooling air flow maintains the temperature of the anode cooling fins constant. The insulated seal 74 operates at 600° F. and is similar to commercially available insulators which perform satisfactorily at such temperatures.

The anode cooling fins 75 are preferably a pair of aluminum fins, 2.5 in. diameter, connected to a common hub which is screwed to the end of the anode lead 81 to provide extruded cooling surface to transfer rejected heat to the diode. The anode electrical lead 84 is connected between the fins 75 of the diodes and an outlet plug 85 (see FIG. 1).

The thermionic converters are supported by an alumina structural member 86 at the cathode end. A coil spring 87 and ceramic insulator 88 are placed over the threaded sleeve 76 on the cathode lead. The cathode electrical lead 77 is then threaded on, compressing the spring 87 and securing the converter diode in place. Holding each diode in place in this manner allows for thermal expansion and provides a shock mounting.

Figure 3:
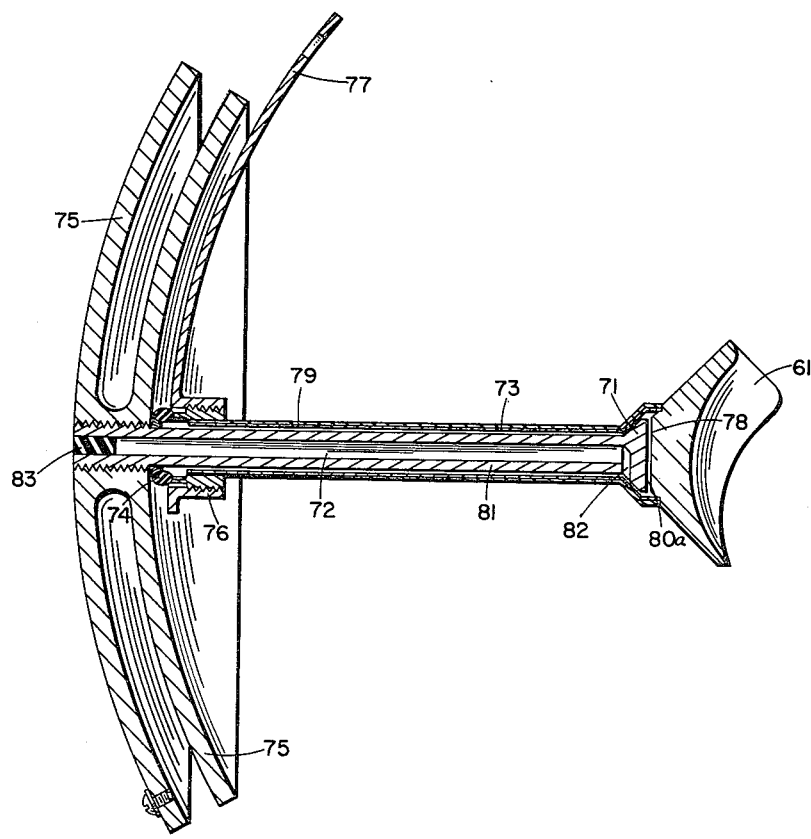
FIG. 3 is a sectional view of one of the diodes utilized in the present invention.

Operation of the present invention as applied to the preferred embodiment will be described with respect to FIG. 3, which shows a partially sectioned perspective view with portions of the insulation removed to more clearly show the structural relationship and arrangement of parts in the preferred embodiment. The following chart shows the characteristics of the preferred embodiment.

*Chart I*

System:
Overall size of unit—
  Height, in_____ 10.
  Diameter, in_____ 7.
System weight, lb. (includes entire power supply, cable, plug, and fuel for 12 hr. operation but not transport case)_____ 4.93.
Total weight of fuel, lb_____ 1.1.
  Fuel reserve for starting and off optimum operation, lb_____ 0.1.
Fuel _____ Leaded gasoline.
Fuel consumption rate at rated power, lb./hr_____ 0.08.

System:—Continued
Fuel tank volume, cu. in_____ 62.
Rated power output, watts_____ 30.
Overall system efficiency, percent_ 6.5.
Rated output voltage, volts_____ 6.0.
Single diode voltage, volts_____ 1.15.
Open circuit voltage, volts_____ 6.1.
Current to 1.2 ohm load amps___ 5.0.
Current to parallel connected fan motor, amps_____ 0.3.

Energy balance:
Electrical energy from converters, watts _____ 32.
Thermal energy rejected by anode to stack, watts_____ 165.
Conduction loss from combustion chamber, watts_____ 55.
Conduction and radation loss from heat exchanger, watts_____ 40.
Stack loss from combustion products, watts_____ 168.
Energy supplied by fuel, watts___ 460.

Thermionic converters:
Number of thermionic converters_ 6.
Efficiency of thermionic converters: gross percent/net percent__ 18/15.2.
Cathode surface temperature, ° F_ 3000.
Anode surface temperature, ° F__ 1445.
Cesium reservoir temperature, ° F 576.
Electrical power density from cathode emitting surface, watts/cm.$^2$ 8.
Cathode—
  Material _____ Molybdenum coated with MoSi$_2$ on burner side.
  Heat transfer area, cm.$^2$_____ 20.
  Emitting surface area, cm.$^2$___ 0.69.

Heat source:
Temperature (° F)—
  Maximum flame temperature__ 5000.
  Air entering combustion chamber _____ 2500.
  Fuel entering combustion chamber_____ 900.
  Combustion products entering regenerator _____ 3270.
  Combustion products leaving regenerator _____ 1520.
  Mixed exhaust gases_____ 600.
Gas flow—
  Combustion air flow, lb./hr____ 1.3.
  Anode cooling air flow, lb./hr__ 8.7.
  Total air flow, lb./hr_____ 10.1.
  System pressure drop, p.s.f____ 2.0.
Regenerator—
  Material _____ Alumina.
  Number of tubes_____ 18.
  Length of tubes, in_____ 2.5.
  Outer diameter of tubes, in____ 0.25.
  Effective heat transfer area, in.$^2$ 60.
Thermal insulation—
  Inner (>2000° F. service)____ Super Sil-O-Cel.
  Outer (<2000° F. service)____ Min-K.

For startup the initial pressure in the fuel tank 20 is created by pump 34; the stack cap 24 and attached chimney 46 are removed, and a lighted match in inserted into the area adjacent hole 68 above the top tube support 64. The fuel supply valve 31 is turned to "start" position so that fuel will flow through both primary and secondary fuel outlet pipes 32 and 33. The match will ignite the fuel from the upper nozzle 68 and the burning fuel will run down the tubes 66 into the combustion chamber 67, igniting the fuel from nozzle 69. Since fuel leaves the injection nozzle 69 as a liquid during the warmup period, the flow through the primary fuel outlet pipe 32 is restricted when the valve 31 is in "start" position. In a short time the regenerative heat exchange 62 achieves operating temperature and the fuel issues from injection nozzle 69 in a fine spray. Simultaneously the air entering the combustion chamber 67 increases in temperature. Since electron cooling of the combustion chamber walls does not occur until the converter parts are near operating temperature, the entire generator will come up to operating temperature rapidly. As soon as there is a voltage indication on meter 90, the fuel valve 31 is placed in "run" position. In this position no fuel flow takes place through secondary fuel outlet pipe 33 and fuel flow through primary outlet pipe 32 is increased. Burning then takes place only in the combustion chamber 67. The fan 27 will also begin to operate at this time and the system will "boot-strap" itself into the region of operating conditions.

The device requires 10 lb./hr. of air, of which about 1.5 lb./hr. is combustion air and the remainder is used for cooling the converter anodes. Air is moved at moderate velocities of from about 2 to about 5 f.p.s. except in the combustion chamber, where velocities of the order of 85 f.p.s. are attained. While convection circulation of the air could be utilized, heat losses primarily due to radiation would be too large to allow reasonable thermal efficiencies.

Coarse manual control of the electrical output in varying ambient situations is accomplished by adjusting the vertical position of chimney 46. Moving the chimney up or down varies the size of the anode cooling air exhaust from region 50 to outlet plenum 52, thereby varying the air flow past the anode cooling surface 75. Once the coarse manual adjustment is in the desired voltage range, fine control of the air flow is accomplished by the segmented bimetallic ring 91 located in the air cooling passage 92 below the exhaust plenum 52. The cooling passage 92 is the outer annular portion of region 50 and is defined by an air flow divider 93 which extends downwardly into region 50 to a position above the anode cooling fins 75. The interior passage 94 defined by divider 93 and outer cover 49 directs incoming air into the air preheater 62. In this manner all the air passing through the device is utilized to cool the anode fins 75 but only a portion is used in the combustion chamber. The temperature sensitive ring 91 opens or closes the cooling passage 92 to compensate for variations in fan speed or ambient air temperature and humidity. Both the coarse chimney control and the bimetallic ring act to keep anode and cesium reservoir temperatures constant by varying the flow of cooling air to these components, thereby assuring operation at optimum conditions. The fan 27 is preferably a D.C. permanent magnet motor having linear voltage speed characteristics. Automatic control of the output voltage is accomplished by variation in motor speed with output voltage of the device as follows. The fan is designed to provide constant pressure over a range of flow rates at constant motor input voltage. Thus under normal operating conditions, when the output voltage is slightly above 6 volts (32 watts) the mixture introduced into the combustion chamber contains about 20% excess air. If the output voltage increases above this point, the fan will deliver more air and the fuel mixture will become leaner due to the resulting increase in available air pressure, thereby lowering the temperature in the combustion chamber and causing the output voltage to seek a power level.

In the opposite situation, where a decrease in output voltage occurs, the fan speed decreases, reducing the air supply to the combustion chamber. Since this air supply is normally above optimum, this decrease results in an increase in combustion chamber temperature, and consequently cathode temperature, causing the output voltage to rise. This self-controlling stabilizing influence of the fan upon output voltage achieves equilibrium in the preferred embodiment at an output voltage of 6.1 volts. At voltages below this level, the cathode 61 runs hotter than the design temperature of 1650° C. and at higher voltages the cathode runs cooler. This response, associated with the use of a fan for forced air circulation through the device, is an important feature in the self-regulation of the present invention.

The load impedance for delivery of 30 watts at 6 volts is 1.2 ohms. The preferred embodiment will adjust to deliver 5 amps to a 1.2 ohm external load. The six series-connected diodes actually deliver 5.3 amps at slightly over 6 volts. About 3000 milliamps are drawn internally by the parallel-connected fan motor at this voltage.

While a preferred embodiment of the present invention has been described, it is apparent to those skilled in the art that many modifications may be made without departing from the spirit of the invention. For example, other converter diode constructions could be utilized and the number and size of the diodes varied depending upon the desired power output. Further, fuel tanks of varying geometry or which include much of the unused volume within the outer casing 21 could be utilized. These and many other modifications apparent to those skilled in the art may be made to the present invention without departing from the scope as defined in the appended claims.

What is claimed is:

1. A portable thermionic power supply comprising a combustion chamber; a source of fuel; means for introducing said fuel into said combustion chamber; means for directing air into said combustion chamber; at least one thermionic converter means for converting heat directly to electricity including a cathode and an anode; means for supporting said cathode so that its outside surface is in heat exchanging relationship to said combustion chamber; means for cooling said anode; means for heating said air prior to entry into said combustion chamber including said means for cooling said anode; and means for controlling the electrical output of said thermionic converter.

2. A portable thermionic power supply comprising a combustion chamber; a source of fuel; means for injecting said fuel into said combustion chamber; at least one thermionic converter means for converting heat directly to electricity including a cathode and anode and having an electrical output responsive to the temperature of said combustion chamber, the outside surface of said cathode being in heat exchanging relationship to said combustion chamber; means for cooling said anode including a cooling air channel; means for injecting at least a portion of said air in said channel into said combustion chamber; means for controlling the amount of said portion, said controlling means being responsive to the temperature of said air in said channel; and means for increasing the temperature of said portion of said air prior to injecting said portion into said combustion chamber.

3. A portable thermionic power supply comprising a combustion chamber; a source of fuel; means for introducing said fuel into said combustion chamber; means for passing air into said combustion chamber; at least one thermionic converter means for converting heat directly to electricity including a cathode at one end, an anode, and a source of ionizable gas; means for supporting said cathode so that its outside surface is in heat exchanging relationship to said combustion chamber; means for cooling said anode and said source of gas, said means for cooling being located at the end of said converter means opposite said cathode; means for heating said air prior to entry into said combustion chamber including said means for cooling; means for transferring heat from gases from said combustion chamber to said air; and means for controlling the electrical output of said converter.

4. A portable thermionic power supply comprising a container; a thermal shield in said container; a combustion chamber within said shield; a heat exchanger supported adjacent said combustion chamber adapted to direct gases away from said combustion chamber and preheat air passing into said combustion chamber; means for injecting fuel into said combustion chamber; means for passing air through said heat exchanger and into said combustion chamber, said last-named means including an air flow path along the outer surface of said container; at least one thermionic converter means for converting heat directly to electricity including a cathode and an anode; means for supporting said converter in said thermal shield with the outside surface of said cathode in heat exchanging relationship with said combustion chamber and said anode in heat exchanging relationship with said air flow path; and means for controlling the output of said converter.

5. A portable thermionic power supply comprising a container; a thermal shield in said container; a combustion chamber supported within said shield; a heat exchanger supported above said combustion chamber; an exhaust plenum located above said heat exchanger and connected through said heat exchanger to said combustion chamber; at least one thermionic converter means removably supported in said shield for converting heat generated in said combustion chamber directly to electricity, said converter means including a cathode with its outside surface in heat exchanging engagement with said combustion zone and an anode; means for cooling said anode including an air flow path along the outside of said container; means dividing said air flow path into a first and second air flow path, said first flow path passing through said heat exchanger to said combustion chamber, said second flow path being connected to said exhaust plenum; means in said second flow path responsive to the temperature of the air in said path for controlling the flow of air in said first flow path; and means for automatically controlling the electrical output of said thermionic converter.

6. A portable thermionic power supply comprising a combustion chamber; a source of fuel; means for introducing said fuel into said combustion chamber; a plurality of thermionic converter means for converting heat directly to electricity each including a cathode and an anode; means for supporting each of said converter means in radially extending arrangement around said chamber with the outside surface of the cathode of each converter means in heat exchanging engagement with said combustion chamber; means for cooling said anodes; means for directing air over said anodes including a fan; means for preheating a portion of said air and injecting said portion into said combustion chamber; means for controlling the electrical output of said plurality of converter means including said fan.

7. A portable thermionic power supply comprising a container having a hemispherical bottom surface; a combustion chamber located within and spaced from said container; a heat exchanger located above said combustion chamber within said container; thermal insulation between said container and said chamber and heat exchanger; a closed outer shell; means for resiliently supporting said container within and spaced from said outer shell; an exhaust outlet at the top of said shell communicating with said combustion chamber through said heat exchanger; an air inlet at the bottom of said shell; a source of fuel supported on said shell; means connecting said fuel source to said combustion chamber, said container defining an air channel adjacent said container and connected to said air inlet; a plurality of thermionic converter means each having a cathode and an anode, each of said converter means being connected to an electrical output; means for resiliently supporting each of said converter means in radially extending relationship to said combustion chamber and having said cathode of each converter means in heat exchanging contact with said combustion chamber, each of said anodes being connected to a cooling fin, said fins being located in said air channel; means for dividing said air channel into a first and second channel, said first channel connecting said air channel to said exhaust outlet, said second channel connecting said air channel to said heat exchanger and said combustion chamber.

8. The portable thermionic power supply of claim 7 including manual means for controlling the flow through said exhaust outlet and means responsive to the temperature of the air in said first channel for controlling the flow of air through said first channel.

9. The portable thermionic power supply of claim 7 including means for automatically controlling the electrical output of said converter means including a fan driven by said electrical output and having a speed of rotation responsive to the magnitude of said electrical output.

10. The portable thermionic power supply of claim 7 including means for automatically controlling the electrical output of said converter means including a fan driven by said electrical output and having a speed of rotation responsive to the magnitude of said electrical output, said fan being rigidly supported in said air inlet, said means for resiliently supporting said container being connected to said fan.

11. The portable thermionic power supply of claim 7 wherein said source of fuel is a toroidal tank and said air inlet is located in the center of said toroidal tank.

12. The portable thermionic power supply of claim 7 wherein each of said converter means has a separate source of ionizable gas, said source being located adjacent said air channel.

References Cited in the file of this patent
UNITED STATES PATENTS

| | | |
|---|---|---|
| 2,980,819 | Feaster | Apr. 18, 1961 |

FOREIGN PATENTS

| | | |
|---|---|---|
| 87,533 | Germany | July 15, 1896 |
| 704,531 | France | Feb. 23, 1931 |
| 854,036 | Great Britain | Nov. 16, 1960 |